(No Model.)

M. T. JONES.
CUFF HOLDER.

No. 371,328. Patented Oct. 11, 1887.

Witnesses.
Howard F. Eaton
Fred L. Emery.

Inventor.
Mariana T. Jones
by Crosby & Gregory
atty's.

UNITED STATES PATENT OFFICE.

MARIANA T. JONES, OF BOSTON, MASSACHUSETTS.

CUFF-HOLDER.

SPECIFICATION forming part of Letters Patent No. 371,328, dated October 11, 1887.

Application filed August 11, 1887. Serial No. 246,693. (No model.)

*To all whom it may concern:*

Be it known that I, MARIANA T. JONES, of Boston, county of Suffolk, and State of Massachusetts, have invented an Improvement in Cuff-Holders, of which the following description, in connection with the accompanying drawings, is a specification, like figures on the drawings representing like parts.

This invention has for its object to construct a cuff-holder, especially adapted for ladies' use, which may be easily and quickly applied and will securely hold the cuff in position.

The cuff-holder herein to be described is made of wire or equivalent material, one end of which is bent to form a hook-shaped button-engaging portion, and the other end is overturned upon the shank portion to serve as a pin to penetrate the material of the sleeve. The shank portion at a point intermediate its length is bent to form a loop, which loop is afterward bent or overturned to form a hook or shield to receive the end or point of the pin.

Figure 1:
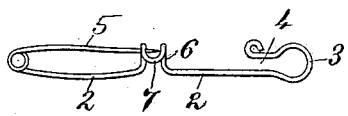
Figure 2:
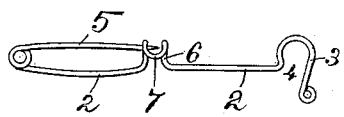

Figure 1 shows in plan view a cuff-holder embodying this invention, and Fig. 2 a similar view of a modified form of cuff-holder.

The wire or strip of material is of suitable length to form the shank portion 2, one end of which is bent to form a hook-shaped loop, 3, having a narrow neck, 4, and an enlarged circular portion, which receives the shank of the cuff-button. The other end of the shank 2 is turned over upon the shank for a suitable distance to form a pin, 5, the end of which is sharpened or pointed, to thereby penetrate the material of the sleeve or other article.

The shank 2, at a point intermediate its length, is bent to present a loop, 6, the extremity of which loop is also bent over, as at 7, backward toward the shank portion, to thereby form a hook or shield, which receives the end or point of the pin 5, so that the attaching device for the cuff-holder resembles an ordinary safety-pin.

In Fig. 2 I have shown the hook-shaped button-engaging end as open at the side instead of at the end, as shown in Fig. 1, which construction is equally desirable.

By making the cuff-holder of a single piece of wire, as herein shown, it may be very cheaply made, and its construction permits it to be very easily operated.

I claim—

As an improved article of manufacture, a cuff-holder made of a single piece of wire, it comprising a shank portion, 2, a button-engaging hook, 3, at one end, the pin 5 at the opposite end, and a hook, 6 7, formed by bending the wire, as shown, at an intermediate point of the shank 2, to receive the end or point of the pin, substantially as described.

In testimony whereof I have signed my name to this specification in the presence of two subscribing witnesses.

MARIANA T. JONES.

Witnesses:
BERNICE J. NOYES,
F. L. EMERY.